April 18, 1950 J. M. AUFIERO 2,504,785
COMBINED ELECTRIC FAN AND HEATER
Filed May 12, 1948 2 Sheets-Sheet 1
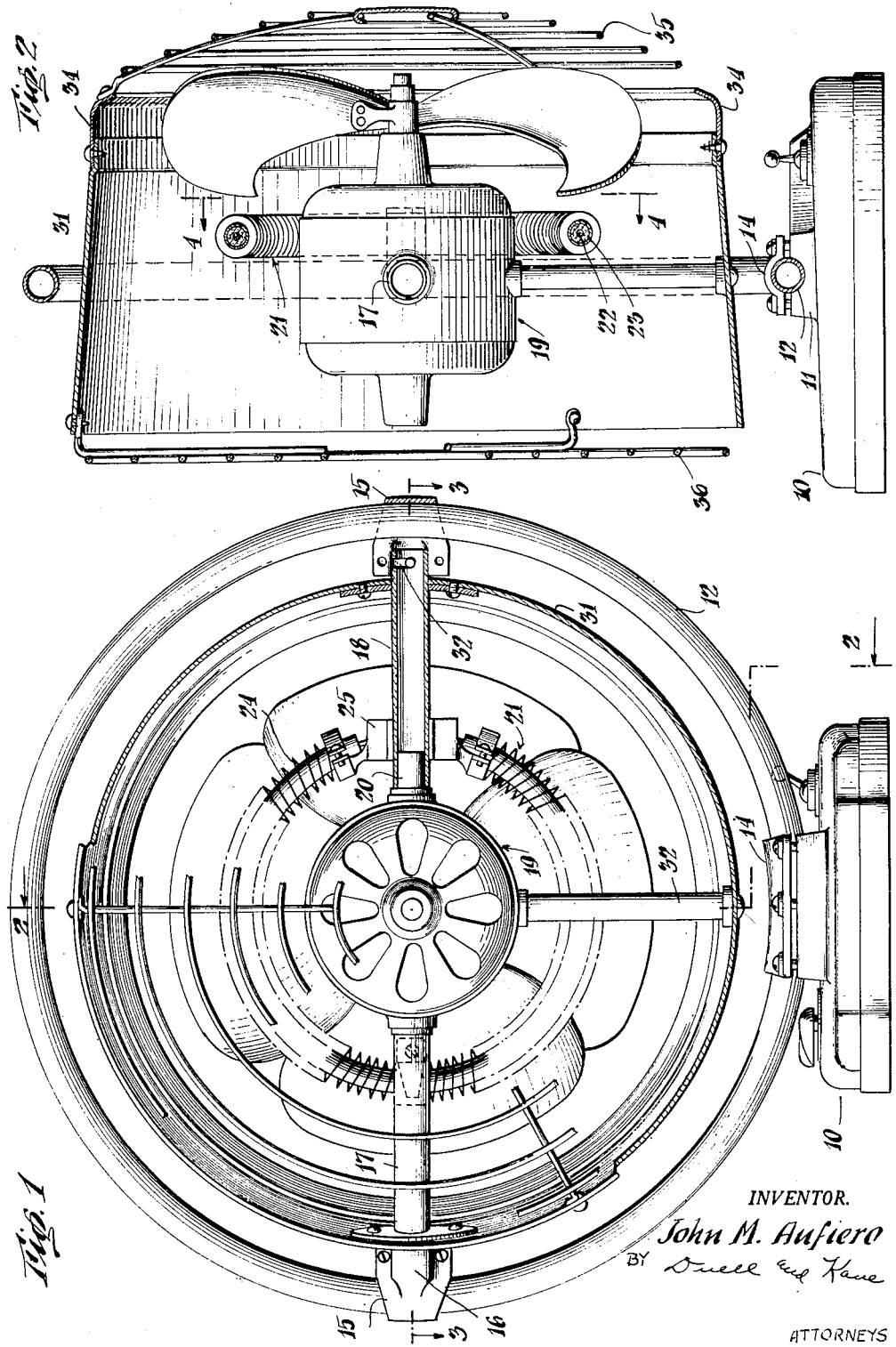
INVENTOR.
John M. Aufiero
BY Duell and Kane
ATTORNEYS April 18, 1950 J. M. AUFIERO 2,504,785
COMBINED ELECTRIC FAN AND HEATER
Filed May 12, 1948 2 Sheets-Sheet 2
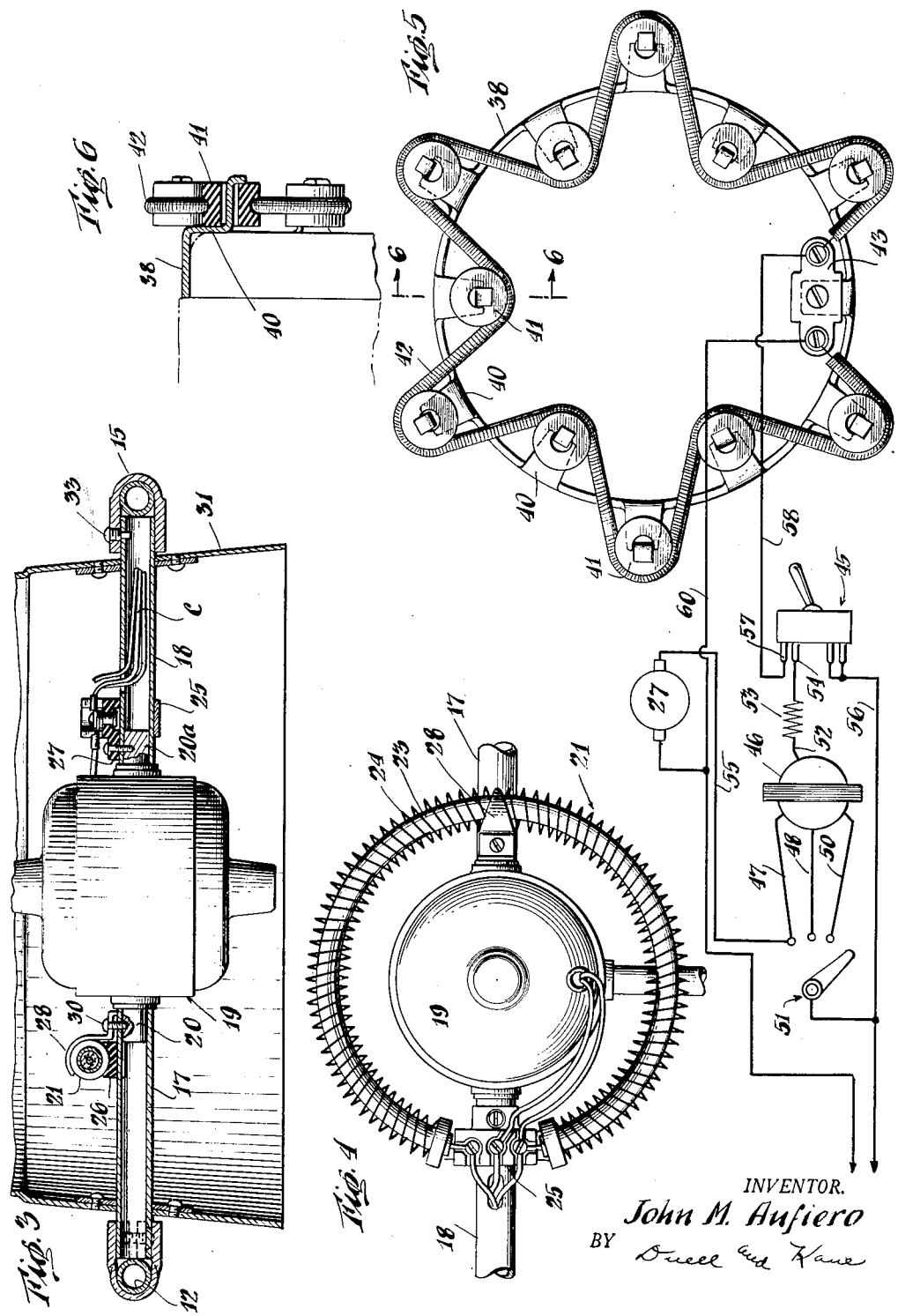
INVENTOR.
John M. Aufiero
BY Duell and Kane
ATTORNEYS Patented Apr. 18, 1950

2,504,785

UNITED STATES PATENT OFFICE 2,504,785

COMBINED ELECTRIC FAN AND HEATER

John M. Aufiero, Plandome, N. Y., assignor to E. A. Laboratories, Inc., Brooklyn, N. Y., a corporation of New York Application May 12, 1948, Serial No. 26,492

1 Claim. (Cl. 219—39)

This invention relates to an improved combination electric fan and heating device.

It is an object of the invention to provide a device as aforesaid, having improved means for mounting the fan unit and heat coil to reduce as much as possible the transmission of motor vibrations to the external housing and thereby to produce a quietly operating unit.

It is another object of the invention to provide a combined portable fan and heater having the fan unit, resistance element and casing so mounted that the direction of the air movement may be directed through a vertical arc, to thereby afford either a vertical or downwardly directed air current.

It is another object of the invention to provide an improved framework or support structure for a combined fan and heater, said framework forming a rigid handle by means of which the device may be carried without imposing strain on the casing or the fan and heater unit.

It is another object of the invention to provide an improved support mounting for the casing of a portable space heater.

It is yet another object of the invention to provide a portable space heater having an improved mounting for the heating unit, to insure that the heat exchange surfaces of the unit and the air circulation means will be always in proper operative relationship.

Other features and advantages will hereinafter be described.

In the accompanying drawings:

Fig. 1 is an elevational view of a portable space heater embodying the present invention;

Fig. 2 is a side elevation thereof, in section on lines 2—2 of Fig. 1;

Fig. 3 is a plan view in section on lines 3—3 of Fig. 1;

Fig. 4 is a side elevation taken on lines 4—4 of Fig. 2;

Fig. 5 is a schematic wiring diagram, showing also a second type of heating element; and Fig. 6 is a side elevation in section through lines 6—6 of Fig. 5.

Referring to the drawings for a more complete description of the invention, my improved room heater comprises a base 10 provided with a saddle 11 to which is clamped a circular frame ring 12. The clamp element 14 is preferably screw threadedly secured to the saddle but may be affixed thereto in other conventional ways.

The frame ring 12 is provided with the diametrically opposed bearing members 15 which are in a line parallel with the base 10. Said bearing members have tubular socket portions 16 into which rotatably fit the ends of the tubular motor supports 17, 18.

A fan motor 19 has a casing provided with stub shafts 20, 20a which fit snugly within the respective tubular motor supports as shown in Figs. 1 and 3.

The supports 17, 18 serve also in the Fig. 1 embodiment to mount the heat coil 21, which may be of the familiar type, see Fig. 2, in which a resistance element 22 is insulatedly mounted in a metallic casing 23, said casing being provided with fins or convolutions 24 to enlarge the heat transfer surface thereof. The heating element is supported by the insulating brackets 25, 26, which preferably are of ceramic or similar composition. The bracket 25 may be directly secured to the motor support 18 by a screw 27 which, see Fig. 3, also serves to secure the stub shaft 20a non-rotatably within said support. The heating unit is preferably clamped to the support 17 as by a bracket 28 through which a screw 30 passes into the adjacent stub shaft 20 as shown. The insulator 26 may be merely a saddle which rests upon the motor support 17.

The insulator 25 serves as a connection block for the motor and heat coil and the electrical connections C are brought into the adjacent support shaft 18 and thence through the frame ring 12 into the base 10 for connection with the several resistance elements and control switches as presently described.

A casing 31 is mounted upon the shafts 17, 18 as clearly shown in Figs. 1 and 3. The casing is mechanically connected with the motor housing by means such as a rigid rod 32 which extends from the motor housing downwardly to a point of attachment with the casing as shown in Fig. 1. The casing is rotatable within the frame ring 12 and it may be swung counterclockwise of Fig. 2 to a vertical position, or clockwise, through an arc of about 100 degrees, to where the fan is directed forwardly and downwardly. To limit the extent of rotation within the ring 12, the shaft 18 is slotted over the necessary arc, as at 32, Fig. 1, for cooperation with a stud 33 projecting through said slot from one of the bearing members 15.

The casing 31 may be provided with a bezel 34 to which the front grille 35 is fixed, and the rear opening of the casing may be provided with any suitable guard means 36.

In Figs. 5 and 6 there is shown a second method of mounting the resistance element relative to the motor fan. A rigid ring 38 has a plurality of ears 40 bent radially and forwardly, as shown in Fig. 6, the ears being bent alternately downwardly and upwardly as shown in Fig. 5.

The inside diameter of the ring 38 is such as to fit snugly about the motor casing to which it may be secured as by screws or equivalent.

Carried on each of the forwardly projecting portions of the ears 40 is an insulator 41, of spool shape, and having a circumferential groove to support the resistance coil 42, wound in sinuous fashion about the several insulators and connected at its ends to the insulated mounting block 43. It will be understood that the resistance element 42 may comprise a coil of bare resistance wire or equivalent.

Fig. 5 incorporates the circuit diagram which is the same for either of the forms of resistance units. The main control switch 45 is of the double pole single throw type. A choke 46 has three taps, represented by the conductors 47, 48 and 50 which connect with contacts on a motor control switch 51, and a fourth tap, represented by the conductor 52, which is attached to one of the throw contacts 54 of the switch 45. A resistance 53 is in series with switch 45 and the choke, as shown.

As appears in the circuit, the fan motor 27 may be operated either with or without the heat coil, but the heat coil may not be placed in circuit without energizing the motor.

Assuming the switch 45 to be in open circuit condition, the switch 51 may be rotated counterclockwise to close with the first switch contact, whereupon a circuit will be completed through switch 51, conductor 50 and the full winding of choke 46, thence through conductor 55 to the motor 27 and to the return of the power circuit. As the switch moves through its positions to its final contact, the choke 46 is cut out of the motor circuit and the motor will operate at maximum speed. If any of the contacts of switch 51 are closed and the switch 45 is then closed, it will be apparent that the heat coil 42 will be energized, the circuit coming from the power source through conductor 56 and throw arm of switch 45, then through the throw contact 57 of said switch and conductors 58, 60 to the return power line. The motor was previously in operation because of the closed switch 51. The secondary motor circuit, which would include the switch contact 54, resistance 53 and conductor 52 would not influence the motor circuit because of the substantially lower resistance path through switch 51 and conductor 55. If the switch 51 is open at the time switch 45 is closed, the heat coil circuit will be completed as aforesaid, and the motor circuit will be established through resistor 53, choke 46 to the choke winding represented by conductor 50 then through the complete choke to the contact 55 and to the motor. It will be apparent that the motor has four speeds, the slowest of which occurs only when the device is used as a space heater.

The advantage of the multi-speed motor control is that an air volume and velocity suitable for summer usage would not be psychologically effective for winter heating, because there would be a relatively small increase in temperature and the user would have the feeling that cool air was being discharged from the heater. At slower speeds, however, the air temperature increase is sensibly apparent.

The rigid connection between the motor and the casing, and the fixed relation of the plane of the fan and the heating element regardless of rotation of the casing within the frame ring insures proper heat exchange relationship between the heating element and the fan-induced air stream.

The frame ring provides a rigid handle by which the device may be carried without imposing strains on the casing or motor unit which might throw these elements out of alignment.

Although the invention has been described by making a fully detailed reference to the certain presently preferred embodiments, such detail of description is to be understood in an instructive rather than a limiting sense, many changes being possible within the scope of the claim hereto appended.

I claim:

In a combination electric fan and heater the combination of a fan motor, a variable choke in series with said fan motor, a first control switch for said motor and choke, a heating resistance element in series with said motor, a resistance connecting said heating element to said variable choke and second switch between said resistance and said element for applying electrical energy to said element optionally through said choke or directly from a suitable supply.

JOHN M. AUFIERO.

REFERENCES CITED

The following references are of record in the file of this patent:

UNITED STATES PATENTS

| Number | Name | Date |
|---|---|---|
| 1,368,328 | Eaton | Feb. 15, 1921 |
| 1,429,085 | McGary | Sept. 12, 1922 |
| 1,840,918 | Seale | Jan. 12, 1932 |
| 1,958,007 | MacDougall | May 8, 1934 |
| 2,119,161 | Hay | May 31, 1938 |